(12) United States Patent
Pierik et al.

(10) Patent No.: US 7,134,860 B2
(45) Date of Patent: Nov. 14, 2006

(54) OVERHEAD WORK AND MOLD STORAGE PLATFORM FOR PLASTIC INJECTION MOLDING MACHINE

(75) Inventors: Steven H. Pierik, St. Clair, MI (US); John E. Welsh, Melvin, MI (US)

(73) Assignee: Industrial Technology Services LLC, St. Clair, MI (US)

( * ) Notice: Subject to any disclaimer, the term of this patent is extended or adjusted under 35 U.S.C. 154(b) by 450 days.

(21) Appl. No.: 10/813,206

(22) Filed: Mar. 30, 2004

(65) Prior Publication Data

US 2005/0220917 A1    Oct. 6, 2005

(51) Int. Cl.
B29C 33/70 (2006.01)
(52) U.S. Cl. .................. 425/88; 425/152; 52/650.3
(58) Field of Classification Search .............. 425/88, 425/152, 542; 52/650.3, 650.11, 653.1
See application file for complete search history.

(56) References Cited

U.S. PATENT DOCUMENTS 3,892,516 A * 7/1975 McGrew et al. ............ 425/443
4,244,682 A * 1/1981 Willingham ................. 425/62
2003/0124210 A1* 7/2003 Kato et al. .................. 425/145

OTHER PUBLICATIONS

Husky Annual Report, p. 9, dated Sep. 1996.*

* cited by examiner

Primary Examiner—Donald Heckenberg
(74) Attorney, Agent, or Firm—Dykema Gossett PLLC

(57) ABSTRACT

The mold access and storage structure comprises an elevated work platform of generally rectangular configuration which is supported at the corners thereof by columns which straddle a machine. The top of the platform includes a walkway and a plurality of spaced apart parallel oil and water containment reservoirs or pans for receiving and storing molds when not in use by the machine and for collecting any oil or lubricant draining from the mold. A vertical ladder permits a person to access the work platform for maintenance purposes. A railing enclosure is mounted around the top of the platform and extends around the outer periphery of the walkway and reservoirs. The railing enclosure includes a pair of slideable gates which, when open, prevents the machine from operating and permits a ladder to be pivoted and moved from the walkway, into the space between the open slideable gates, thereby permitting a maintenance worker to access the top of the machine.

21 Claims, 5 Drawing Sheets

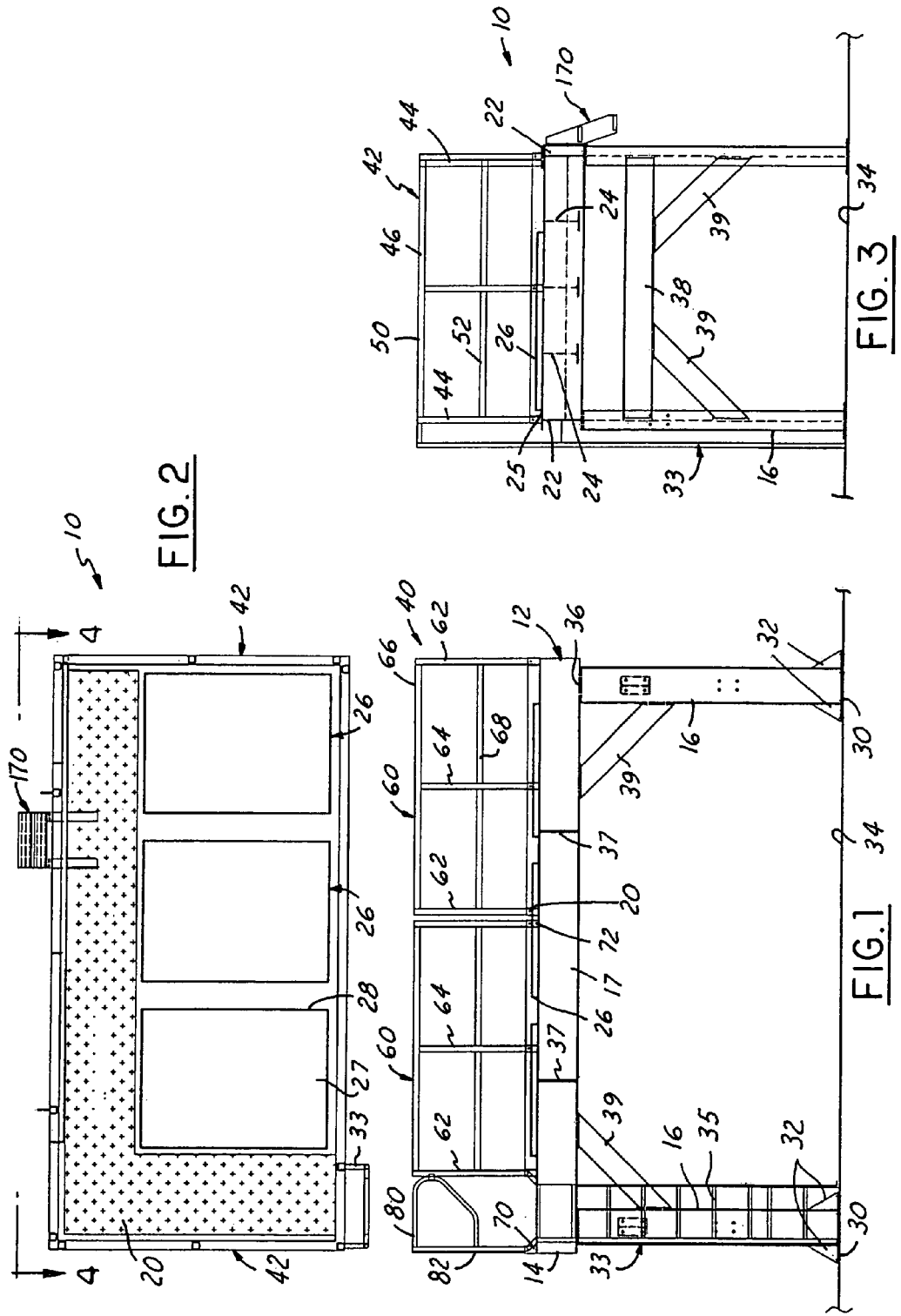

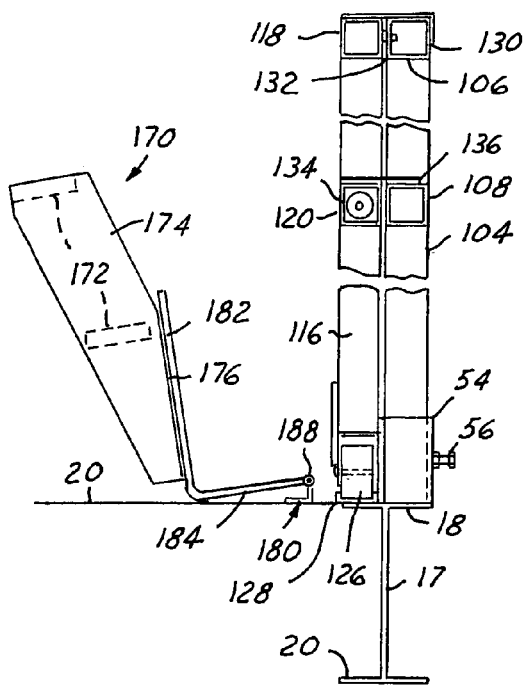
FIG. 8
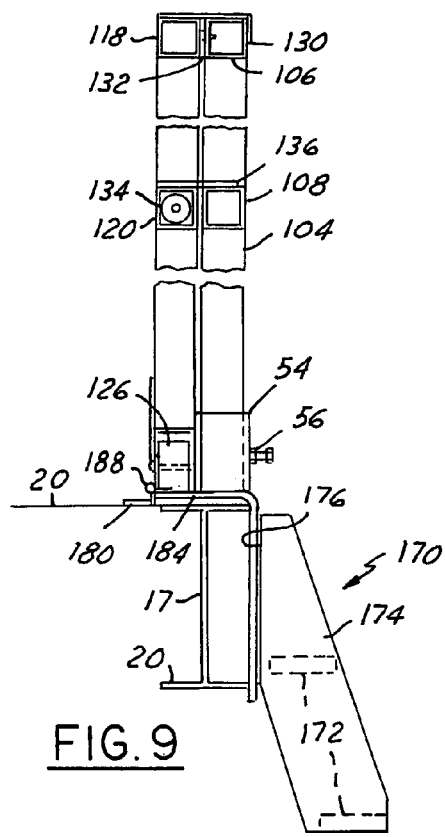
FIG. 9
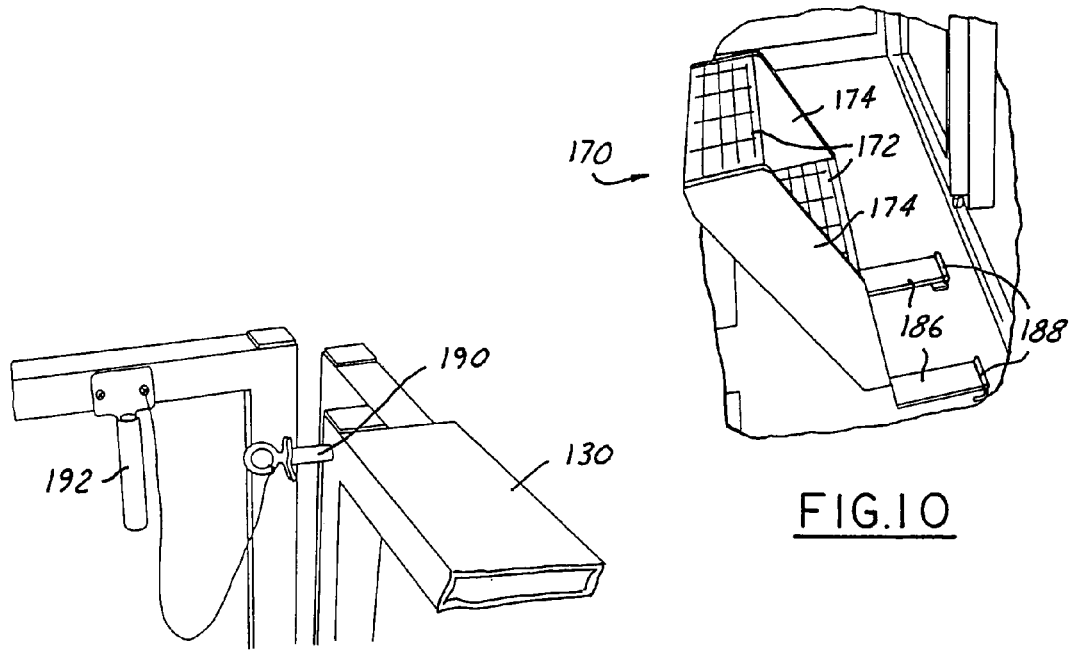
FIG. 10
FIG. 11

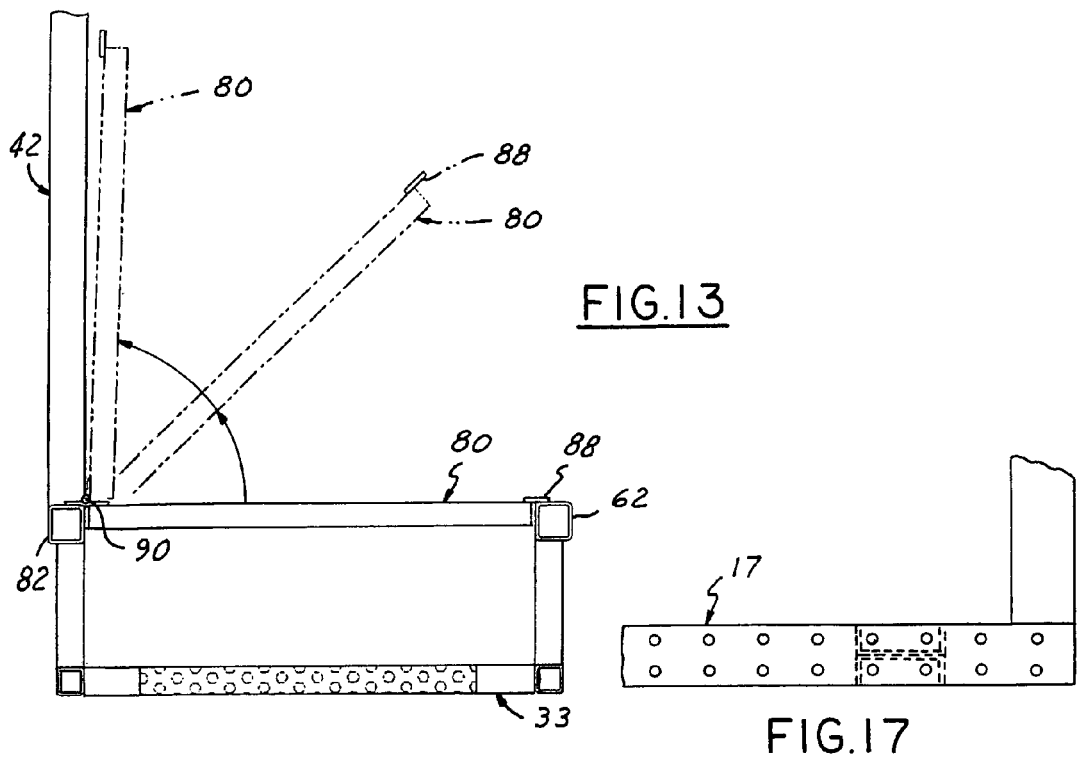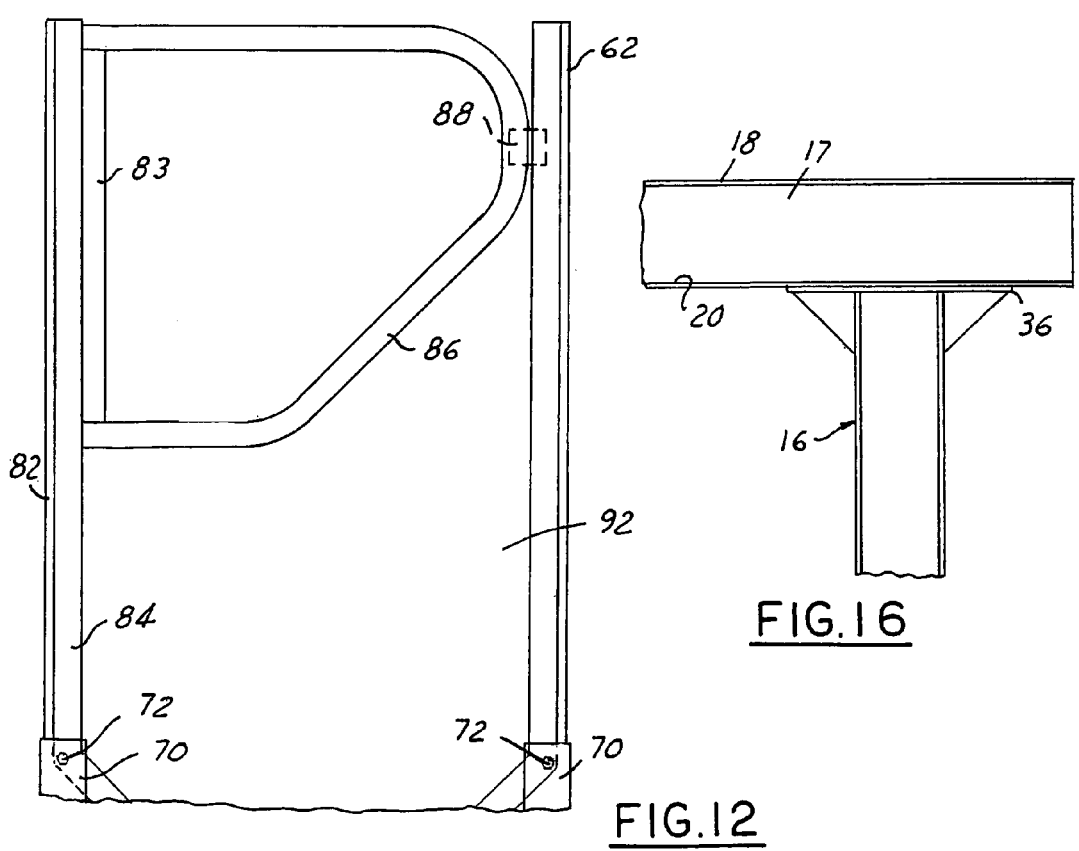

OVERHEAD WORK AND MOLD STORAGE PLATFORM FOR PLASTIC INJECTION MOLDING MACHINE

BACKGROUND OF THE INVENTION

1. Field of the Invention

The present invention relates to a mold access and storage structure for a machine, as an example, an injection molding machine, where an overhead work platform supported by a plurality of legs straddle the machine for holding the platform above the machine. Molds or tools are stored in areas provided in the platform and workmen can access the machine from the platform for repair and maintenance purposes.

2. Description of the Prior Art

The plastic industry uses large machines, as an example, 500 to 1750 ton injection molding presses. For access to the tops of the machines, it is extremely difficult to reach without using the machines as ladders. Such use of the machines as ladders is unacceptable to state and federal agencies involved with plant safety, personnel and environmental issues. The storage of molds at the base of the machine or in the surrounding areas interferes with the work flow.

SUMMARY OF THE PRESENT INVENTION

The present invention offers a solution to the aforementioned problems. The elevated or overhead platform of the mold or tool access and storage structure provides a maintenance worker with direct access to the top of the machine. In addition, the elevated platform provides a storage area for molds or tools above the machine, with the molds/tools being moveable into and out of the machine by an overhead crane. In the past, molds for the injection molding machine have occupied floor space surrounding the machine. In addition, the tools or molds are stored within the envelope of the machine. Thus, without the molds on the floor, the plant has greater flexibility for the layouts of machines in the work areas and provides for greater flow of the work in process.

In addition, with the molds stored above the machine on the elevated or overhead work platform, a much quicker or faster procedure for changing molds is provided which benefits the economics of this technology. It is appreciated that the overhead crane has a shorter distance to move to the top of the machine, manipulate the tools or molds and to replace the tools/molds in the machine.

The mold access and storage structure of the present invention may be manufactured in different sizes to cover a very broad range of injection molding machines, rated from 500 to 1750 ton or larger capacities.

It a feature of the present invention to provide a mold access and storage structure having an elevated or overhead work platform with a generally rectangular horizontally extending frame. The frame is supported by a plurality of legs which are attached to the frame and straddle the machine for holding the overhead work platform above the machine. A walkway is mounted on the frame along one of the longitudinal and transverse sides. The work platform has a plurality of spaced apart parallel oil and water containment reservoirs which are carried by the frame adjacent the walkway and along the other transverse and longitudinal sides. Each reservoir has a bottom wall and four upstanding side walls for receiving and storing a mold when not in use by the machine and for collecting any oil or lubricant draining from the mold. A vertical ladder has upper and lower ends for permitting a person to access the walkway. The ladder has the lower end engaging the ground and the upper end attached to the frame at the entrance to the walkway.

Another feature of the present invention is to provide a mold access and storage structure of the aforementioned type wherein the frame is comprised of structural steel members which are fastened together to form the rectangular frame.

Still another feature of the present invention is to provide a mold access and storage structure of the aforementioned type wherein the structural members forming the frame are connected to the legs by nuts and bolts which are removable to permit the frame and elevated work platform to be disassembled from the legs to permit the machine to be repaired.

A further feature of the present invention is to provide a mold access and storage structure of the aforementioned type wherein a railing enclosure is mounted on the top of the frame, said enclosure extending around the outer periphery of the walkway and reservoirs.

A still further feature of the present invention is to provide a mold access and storage structure of the aforementioned type wherein the railing enclosure includes an inwardly swingable gate which is located above the vertical ladder to permit a person to open the gate inwardly to access the work platform and the molds stored in the reservoirs.

Another feature of the present invention is to provide a mold access and storage structure of the aforementioned type wherein the swingable gate is mounted on the railing by a pair of spring loaded hinges which return the gate to a closed position once the opening force against the gate has been removed.

Still another feature of the present invention is to provide a mold access and storage structure of the aforementioned type wherein the railing enclosure includes a pair of slideable rail panels, movable towards and away from each other to close and open the space therebetween and a flip-out ladder hingedly connected to the walkway, with the flip-out ladder being provided with only a few steps and swingable through the space between the slideable rail panels when open to permit a person to climb down the flip-out ladder to reach the top of the machine.

A further feature of the present invention is to provide a mold access and storage structure of the aforementioned type wherein the slideable rail panels are provided with rollers engageable with tracks mounted along the walkway which permit the gates to roll freely.

A still further feature of the present invention is to provide a mold access and storage structure of the aforementioned type wherein a safety latch and switch is mounted on the slideable rail panels of the railing enclosure, with the switch being connected to the emergency stop circuit of the machine so that when the slideable rail panels are opened, the safety switch is also opened thereby preventing the machine from operating.

Another feature of the present invention is to provide a mold access and storage structure of the aforementioned type wherein the frame includes a pair of longitudinally spaced apart structural member deck girders, having upper and lower flanges, with the lower flanges have a plurality of longitudinally spaced apart holes arranged in patterns to permit the legs to be attached to the structural member deck girder at different locations in order to increase or decrease the length of the deck girders to fit the machine.

The final feature of the present invention is to provide a mold access and storage structure of the aforementioned type which is engineered to optimize available work space, provide for safety and product changeover, is economical to manufacture, efficient in operation and may be disassembled and then reassembled to permit major repair and/or reconstruction of the injection molding machine.

BRIEF DESCRIPTION OF THE DRAWINGS

FIG. 1 is an elevational view of the mold access and storage structure;

FIG. 2 is a plan view of the mold access and storage structure of FIG. 1;

FIG. 3 is an end view of the mold access and storage structure of FIG. 1;

FIG. 8 is a fragmentary elevational view showing the flip-out ladder in an inoperative position inside the pair of slideable panels and hinged to the walkway;

FIG. 9 is a fragmentary elevational view showing the hinged mounted flip-out ladder moved to a position outside of the slideable panels thereby permitting a person to access the top of the machine;

FIG. 10 is a perspective view of the hinge mounted flip-out ladder in an inoperative position inside of the slideable panels;

FIG. 11 is a fragmentary perspective view of one corner of the railing panels showing a pin for connecting a slideable panel to another panel to lock same in an open position;

FIG. 12 is a front elevational view, with parts broken away, of the gate permitting a person to have access to the platform;

FIG. 13 is a top view of FIG. 12 showing the spring loaded safety gate moveable only inwardly to permit a person to have access from the vertical ladder to the platform;

FIG. 16 is a fragmentary elevational view showing a deck girder with a series of bolt openings in the bottom flange attached to a load bearing plate and column;

FIG. 17 is a top view of FIG. 16, illustrating a repeating hole pattern for column span adjustment.

DETAILED DESCRIPTION OF THE PREFERRED EMBODIMENTS

Figure 4:
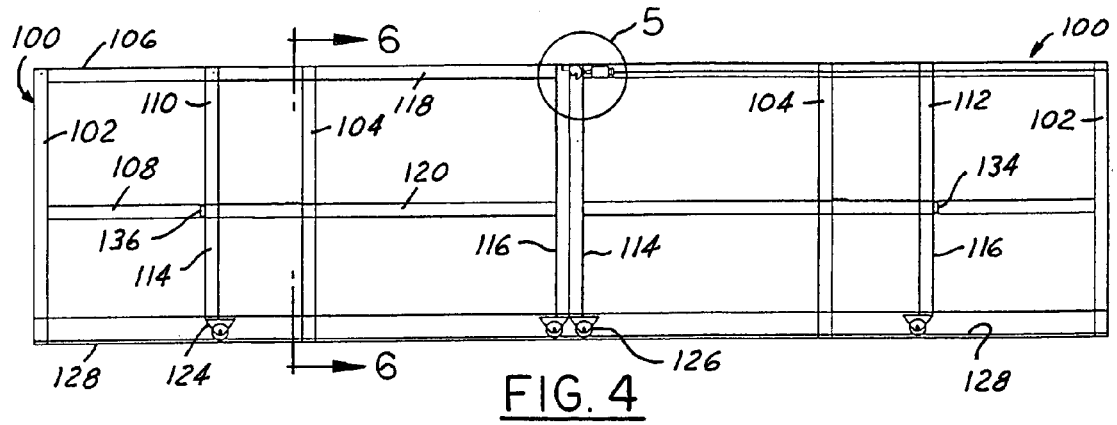
FIG. 4 is a view of one side of the rail enclosure of the overhead platform looking in the direction of arrow 4—4 of FIG. 2 and illustrating a pair of slideable gates or panels in a closed position.

The mold access and storage structure is designated by the numeral 10. It includes an elevated work platform 12 having a generally rectangular horizontally extending steel frame 14 supported generally at the corners thereof by upstanding vertical columns or legs 16. The legs 16 are attached to the frame 14 and straddle a machine 15 (FIG. 15), as an example, an injection molding machine, for holding the elevated work platform 12 above the machine. Each column 16 may be an I-beam or other structural steel member capable of carrying the load.

The steel frame 14 is made from a pair of longitudinally extending, transversely spaced apart I-beam deck girders 17 having an upper flange 18 and a lower flange 20 as shown in FIG. 16. A pair of transversely extending I-beams 22 (FIG. 3) are provided with end plates and are located between and fastened to adjacent ends of the I-beam deck girders 17 to provide the generally rectangular frame 14. The frame 14 further includes a plurality of I-beam cross members 24 to provide additional structural support for the work platform 12. The I-beams 22, 24 are bolted to the deck girders 17.

The structural steel members or deck girders may be of different cross-sections or shape capable of carrying the load. As an example, the member may be square, round, I configuration and the like.

The elevated work platform 12 includes a steel walkway or floor plate 20 extending along one longitudinal side of the platform 12 and one transverse side of the platform 12 as best illustrated in FIG. 2. The floor plate 20 is of L-shaped configuration. The platform 12 includes a deck plate 25, which may be a part of the floor plate 20, which overlies and is secured to the frame members. The deck plate 25 is provided with and supports, as an example, three spaced apart parallel oil and water containment reservoirs or pans 26. The reservoirs 26 are of relatively shallow depth, as an example ¾ of an inch, and are carried by the deck plate 25 and frame 14 along the other of the transverse and longitudinal sides of the platform 12 as shown in FIG. 2. Each reservoir or pan 26 has a bottom wall 27 and four upstanding side walls 28 for receiving and storing a mold when not in use by the machine and for collecting any oil or lubricant draining from the mold.

Each leg or column 16 is an I-beam or other structural member having at the bottom thereof a base plate 30 which is welded to the column 16. Reinforcing gusset plates 32 are provided between the columns 16 and the base plates 30. The base plate 30 of each column or leg 16 is bolted to the floor 34 to prevent lateral movement of the mold access and storage structure 10. The upper end of each column 16 is provided with a load bearing plate 36 upon which an end of a longitudinally extending I-beam deck girder 17 is mounted as shown in FIG. 16. The lower flange 20 of the I-beam deck girder 17 is provided with four sets of holes, each set having four holes or openings for securing or bolting the I-beam deck girders 17 to the load bearing plate 36. Depending on the length of the machine, one of the four sets of holes is selected for mounting the deck girder 17 on the column 16. Thus, it is possible to refit the platform to the columns 17 at any of the other hole sets for column span adjustment.

The elevated work platform 12 is removeably mounted on the columns 16. The frame 14 includes on opposite sides thereof a pair of centered lifting lugs 37 which may be connected to the hook and cable of an overhead crane to lift the platform 12 from the columns 16, after the bolts have been removed, to permit or provide for major repair to the machine.

The platform structure 10 further includes additional horizontal structural member 38 and cross braces 39 between the columns 16 and between the frame 14 and columns 16 for rigidifying the entire structure 10. End plates are provided on the structural members 38 and cross braces 39 to permit or provide for a bolted connection to the columns 16 and frame 14.

Figure 15:
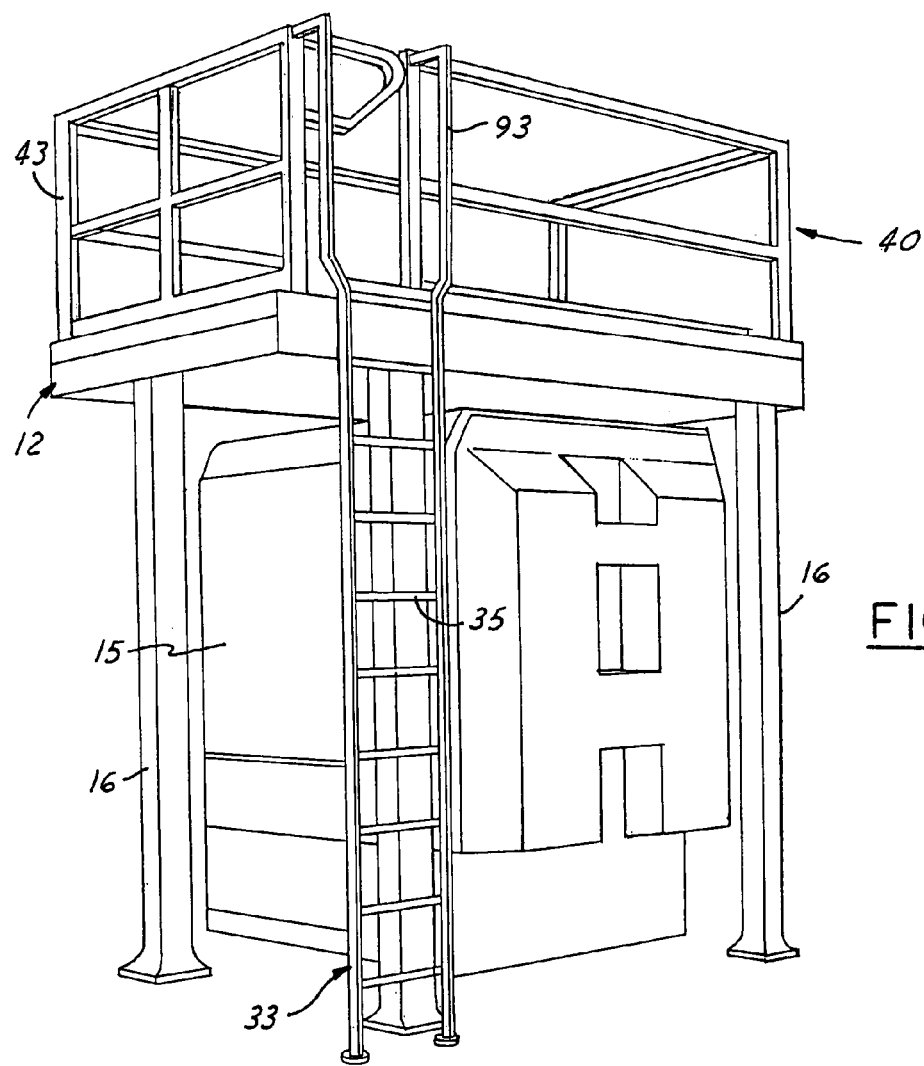
FIG. 15 is a perspective view showing a mold access and storage structure surrounding an injection molding machine.

A vertically mounted walk through ladder 33 is located adjacent to and may be supported by a column 16. The ladder 33 has a series of steps 35 and has the lower end of the ladder engaging the floor 34 and the upper end terminating near the work platform 12 as shown in FIG. 15.

Figure 6:
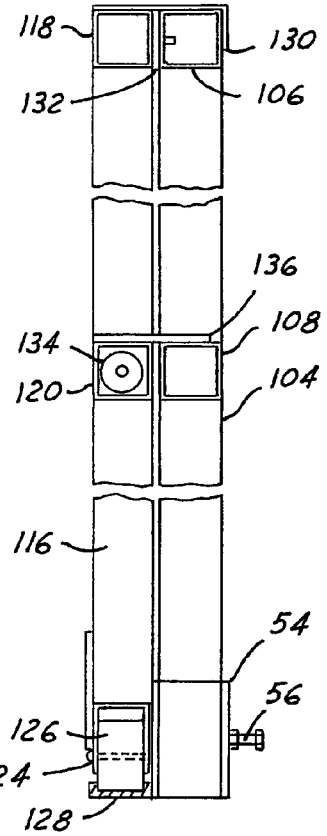
FIG. 6 is a sectional view taken on the line 6—6 of FIG. 4.

As an optional feature, the work platform 12 may include a removable railing enclosure 40 (FIGS. 1–4) which extends around the outer periphery of the frame 14 to enclose the floor plate 20 and the reservoirs 26. The removable railing enclosure 40 includes a pair of end panels 42 (FIG. 2) which extend along the transverse sides of the enclosure 40. The panels 42 each has a pair of vertically extending tubular posts 44, a center post 46 and a pair of horizontally extending tubular rails 50 and 52. The vertical posts 44, 46 and the horizontal rails 50, 52 are connected together, as an example, by welding. The lower ends of the posts 44 and 46 are received in tubular sockets 54 (FIGS. 6, 8 and 9). The upstanding tubular sockets 54 are welded to the frame 14. Each socket 54 has one or more adjusting screws 56 for securing the lower ends of the posts 44 and 46 in place.

The front longitudinal side of the mold access and storage structure 10 (FIG. 1) has a pair of panels 60, similar in construction to the panels 42. Each panel 60 has a pair of tubular end posts 62 and a tubular middle post 64. Panels 60 each includes a top rail 66 and a intermediate rail 68. The rails 66, 68 and posts 62, 64 are connected together, as an example, by welding. The lower ends of the posts 62 and 64 of each panel 60 are received in tubular sockets 70, similar in construction to the socket 54 of FIG. 6. The lower end of each post 62, 64 is held in the socket 70 by a set screw or adjusting screw 72.

At the left end of the panel 60, as viewed in FIG. 1, is located an inwardly swingable gate 80 which is mounted on a vertical post 82. The vertical post 82 has a lower end 84 which is received in an upstanding tubular socket 70 secured to the frame 14. The post 82 is held in position by an adjusting screw 72 as shown in FIG. 12. The gate 80 has a vertical post 83 and a bent laterally extending cross piece 86 provided with a stop element 88 engageable with the post 62 when closed. The gate 80 is a spring loaded safety gate which has a pair of vertically spaced spring biased hinges 90, one hinge shown in FIG. 4 and FIG. 13, mounted between the vertical post 82 and the gate post 83.

As illustrated in FIGS. 1 and 12–15 inclusive, a workman climbs the ladder 40 and walks through the space 92 onto the cover plate 20 of the platform 12 by applying a force to the gate 80 against the bias or closing force of the springs 90 to open the safety gate 80 and access the platform 12. Once inside the enclosure 40 and the force is removed from the gate 80, the biasing springs 90 return to the gate 80 to the closed position of FIGS. 12 and 13. The vertical rails of the ladder 33 at the upper ends have a pair of hand rail extensions 93 as shown in FIG. 15.

The back longitudinal side of the rail enclosure 40 is shown in FIG. 4. The walkway or cover plate 20 extends along the longitudinal edge at the rear of the platform 12. The removable railing enclosure 40 includes at the ends thereof a pair of tubular railing panels 100 including vertical posts 102 and 104 connected together by a top rail 106 and an intermediate rail 108. The vertical posts 102, 104 have end portions which are received in tubular sockets 54 and secured in place by the adjustable screws or fasteners 56 as shown in FIG. 6. In order to close the space between the opposing ends of the fixed panels 100, a pair of slideable rail panels or gates 110 and 112 are provided. Each slideable rail panel 110, 112 is of similar construction with the exception of the latching and safety mechanism shown in FIG. 5.

Each slideable rail panel 110, 112 has a pair of upstanding vertical posts 114 and 116 respectively. The vertical posts 114, 116 are connected by a top rail 118 and an intermediate rail 120. The lower end of each vertical post 114, 116 is provided with a rigid caster assembly 124 which is fixed to the bottom of the corresponding post 114, 116. Each caster assembly 124 rotatably supports a rotatable wheel or roller 126 which is designed to ride on a lower caster track 128 which extends in the longitudinal direction from one end of the platform 12 to the other end. The slideable panels or gates 110, 112, when opened, roll freely on the track 128.

Figure 7:
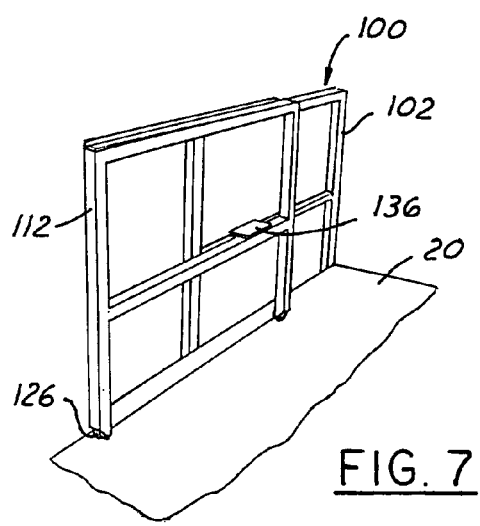
FIG. 7 is a fragmentary perspective view of one slideable gate, moveable with respect to an adjacent fixed panel of the rail enclosure.
Figure 14:
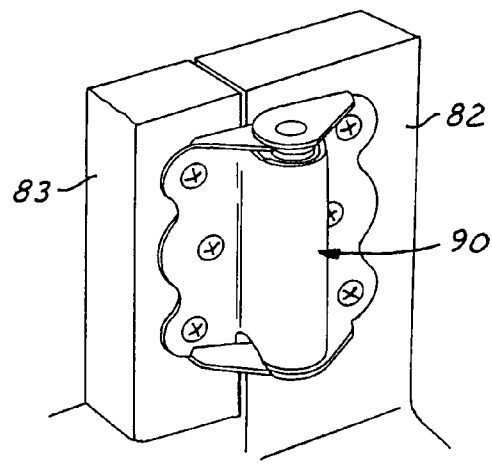
FIG. 14 is perspective view of one of the spring loaded hinges provided on the safety gate of FIGS. 12 and 13.

The upper end of the slideable gate assembly as shown in FIG. 6 is provided with an upper retention track 130. A plastic skid plate 132 is secured to one side of the rail member 106 against which the slideable gate 110 passes. A rubber bumper 134 is mounted on the outer sides of the vertical posts 114, 116 and provides a means for cushioning the gates 110, 112 should the gates contact the outer posts 102. A gate stop 136 is provided to limit travel of the gate as shown in FIGS. 6 and 7.

Figure 5:
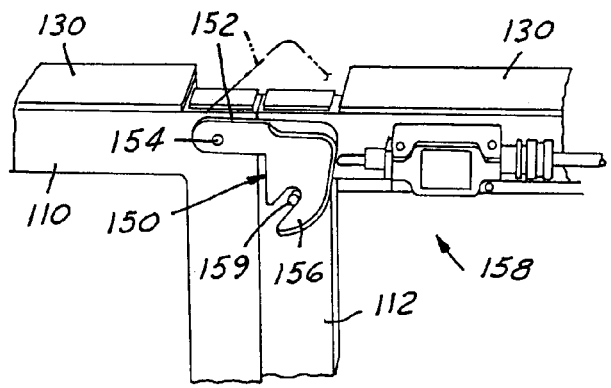
FIG. 5 is a fragmentary elevational view of the latching and safety mechanism between the pair of slideable rail panels, enclosed within the circle 5 of FIG. 4.

A safety latch and electrical stop switch assembly is best illustrated in FIG. 5. The slideable gates 110 and 112 are illustrated in a closed position. A mechanical latch 150 has one arm 152 pivoted at 154 to the slideable gate 110. The latch 150 further includes a keeper or catch 156 engageable with a latch pin 159 carried by the other slideable gate 112. Safety latch/E-stop switch 158 is electrically connected to the E-stop of the machine which is the emergency stop circuit. When the gates 110, 112 are open, the switch 158 inhibits the machine from operating. Thus, when the gates 110, 112 are moved apart, the switch 158 opens since it is connected to the E-stop or emergency circuit of the machine. As a result, the machine stops running and it is safe for a person to access the tool or mold in the machine.

In order to assist a person in reaching the top of the machine when the gates 110, 112 are open, a relatively short two step flip-out ladder is provided as shown in FIGS. 8–10. The ladder 170 has a pair of non-skid steps 172. The ladder 170 has a pair of sides 174, with the steps 172 supported and secured therebetween. The sides 174 are provided with angled surfaces 176. An L-shaped hinge plate 180 has one side 182 welded to the angled surfaces 176 of the ladder 170. The other side 184 of the hinge plate 180 is divided into a pair of straps 186. The outer ends of the straps 186 has hinges 188 connected between each strap 186 and the floor plate 20. The purpose of the pair of hinges 188 is to permit the flip-out ladder 170 to be swung from the position as shown in FIGS. 8 and 10 about the hinges 188 through the opening or space between the slideable gates 110, 112 onto the top of the machine as illustrated in FIG. 9. The lower step 172 terminates short of the top of the machine. When the slideable gates 110, 112 are open and as a further safety precaution, a pin 190 is provided to lock one of the slideable gates 110, 112 to the opposing fixed panel so that the gates 110, 112 cannot close. The pin 190 is removed prior to closing the gates and the pin 190 is inserted into a pin holder 192 carried by an adjacent end panel as shown in FIG. 11.

The mold access and storage structure 10 will be available in different sizes to cover a very broad range of injection mold machines. By providing in the deck girders 17 the four sets of holes as illustrated in FIGS. 16 and 17, each column 16 can be used with any one set of holes so that certain results are accomplished. First, the columns 16 can be closely associated with the sides of the machine or press thereby keeping the envelope very tight. The sets of holes also provide for adjustability to suit the different machines so that if additional width is required, it can be provided with the same deck girders and columns. As mentioned previously, the molds will be raised and lowered by an overhead crane mounted in the structural bay of the plant. Not all cranes will land in the same spot. Thus, the location between the deck girders 17 and the columns 16 can be adjusted to compensate for the location of the overhead crane. With the present construction, the width of the columns 16 can be spaced differently based on the selected hole pattern.

The straight vertical ladder 33 permits a workman to climb to the platform 12 and enter the platform through the gate 80. Once the person is safe inside the enclosure 40, the workman can walk along the cover plate 20, first along the transverse side and then along the longitudinal side of the platform 12 where the slideable gates 110, 112 are located. The pans or reservoirs 26 are tacked down onto the cover plate 20 or deck plate 25. If the program for the machine changes, the reservoirs 26 can be replaced, as an example, two large reservoirs can replace the three smaller reservoirs or pans 26 indicated in FIG. 2. This would constitute a very low cost adjustment. If it becomes necessary that five smaller tools are required, then five corresponding smaller pans or reservoirs could be substituted for the existing ones on the platform 12. Each pan 26 is a tool which is sometimes hooked up to water or oil. It is known that the oil will drain or leak out of the molds and the pans collects the oil so as to prevent the oil from landing on somebody underneath the platform 12 or contacting the machine. If a person sees oil on the floor or on the platform 12, they know there is a leak which can be corrected promptly. A person merely wipes up the oil very quickly and moves along.

A feature of the present invention is the use of the sliding gates 110, 112 on the backside of the platform 12. When the gates are apart, the safety stop switch 158 discussed previously opens. Such switch 158 is tied to the E-stop of the machine since you do not want a person to walk onto the tool or mold which could be opening or closing in the injection molding machine. When the sliding gates 110, 112 are open, the machine stops. Thereafter the mechanic or maintenance person can move the flip-out access ladder 170 into the space between the sliding gates and onto the top or near the top of the machine which is outside of the enclosure 40 as shown in FIG. 9. The access ladder 170, when lowered, inhibits the gates 110, 112 from closing thereby inhibiting or preventing the switch 158 from closing and the machine from operating.

A further feature of the present invention is to provide the locking pin 190 for locking the sliding gates 110, 112 in an open position according to a lockout or tag out procedure. Thus, once the ladder 170 has been swung onto the top of the machine and the gates have parted, a pair of holes in the fixed panel and the removable gate are aligned to receive pin 190 as shown in FIG. 11.

With the present invention, a means is provided to get to the top of an injection molding machine, without using the machine as a ladder. The platform 12 of the present invention permits a person to gain access to the top of the machine safely but also provides a storage space for the molds above the machine. This structure has created additional floor space since the tools or molds would normally be on the floor next to the machine or at some mold storage area. In addition, the present invention permits the tool or molds to be stored within the envelope of the machine so that the molds will not take up any floor space thus providing the plant with greater flexibility for plant layouts and manufacturing flow. This is very critical for the successful operation of the business. In addition, the location of the molds at the top of the platform 12 permit for quicker or faster mold change which is also essential to the financial success of the business.

The mold access and storage structure of the present invention may be used with 500 ton to 1750 ton molding presses or machines which vary in length from 30 feet, height six to seven feet to fifty feet in length and twelve feet in height. Thus, the molds which are used with these large plastic injection molding machines are also of considerable size and weight and require a storage space where the tools/molds can be safely located. The location of the molds above the machine on the work platform has been approved by an appropriate agency of the State of Michigan (MIOSHA).

Another feature of the present invention is that the structural members including the frames, legs and supporting structures are mechanically fastened together by nuts and bolts. Thus for maintenance purposes, all structural parts can be removed. The platform 12 itself can be removed by an overhead crane from the columns 16 to permit repair and reconstruction of the machine.

The proprietary structure of the present invention has many advantages over the prior art. When the molds are stored on the floor adjacent to the machine, they interfere with traffic around the machine, causing people to stumble over the molds. This could result in serious injury. With the use of the overhead cranes in most major plants, the cranes lifts the molds to the elevated platform and store them in definable locations without preventing entry to the overhead platform 12 by maintenance personnel. In other words, with the molds stored in the reservoirs 26, the maintenance worker can go about his or her duties by opening the slideable gates 110, 112 after removing the latch 150 and opening the safety switch 158. Thereafter, the worker moves the flip-out ladder 170 between the gates down to the top of the machine. A person can safely work on the machine knowing full well that the E safety switch 158 is open thereby preventing the machine from operating.

Thus with the present invention, the mold access and storage structure or platform has the following advantages:

A. It allows the die setters or maintenance workers access to the top of the machine platen or tool in the press or machine without climbing the machine to get there. According to MIOSHA inspectors, this solution provides a safe and satisfactory means of access to the area. It allows for connection or disconnection of services at the top of the molds as well as connection or disconnection of the crane for safe mold changes.

B. It allows for the mold to be stored overhead on the platform that would otherwise be taking up floor space either besides the machine or in a centralized area. This floor space can in many cases be utilized for improved manufacturing cell layout and product flow to and from machines to increase the overall efficiency of the operation.

C. It allows for a more efficient mold change due to the mold being stored closer to the point of use in the molding machines. This can provide time savings that can be critical in maintaining quick changeover targets and reduced inventory in a manufacturing environment.

The invention claimed is:

1. A mold access and storage structure for a machine comprising:

an elevated platform having a generally rectangular horizontally extending frame, a pair of parallel longitudinally extending sides and a pair of parallel transversely extending sides extending upwardly from said frame;

legs attached to said frame and straddling the machine for holding said platform above the machine;

a walkway mounted on said frame along one of said transverse sides and one of said longitudinal sides;

a plurality of spaced apart parallel oil and water containment reservoirs carried by said frame adjacent said walkway and along the other transverse and longitudinal sides;

said reservoirs each having a bottom wall and four upstanding side walls for receiving and storing a mold when not in use by the machine and for collecting any oil or lubricant draining from the mold; and a vertical ladder with upper and lower ends for permitting a person to access said walkway, said ladder having the lower end engaging the ground and the upper end attached to said frame near said walkway.

2. The mold access and storage structure as recited in claim 1, wherein said frame is comprised of structural steel members which are fastened together.

3. The mold access and storage structure of claim 2, wherein said structural steel members forming said frame are connected to said legs by nuts and bolts which are removable to permit the frame and associated structure to be disassembled from said legs to permit access to the machine for repair and maintenance purposes.

4. The mold access and storage structure of claim 1, wherein said sides include a railing enclosure mounted at the top of said frame and which extends around the outer periphery of said walkway and said reservoirs.

5. The mold access and storage structure as recited in claim 4, wherein said railing enclosure includes an inwardly swingable gate forming a part thereof, said swingable gate being located above said ladder, said gate, when opened inwardly, permitting a person to access the platform and the molds stored in the reservoirs.

6. The mold access and storage structure as recited in claim 5, wherein said swingable gate is mounted on said railing enclosure by a pair of spring loaded hinges which return the gate to a closed position once the force against the gate to open has been removed.

7. The mold access and storage structure as recited in claim 4, wherein said railing enclosure includes a pair of slidable rail panels, movable towards and away from each other, to close and open the space therebetween; and a flip-out ladder hingedly connected to said walkway; said flip-out ladder being provided with only a few steps; said flip-out ladder being swingable through the space between said slidable rail panels when open to permit a person to climb down the flip-out ladder to the top of the machine.

8. The mold access and storage structure defined in claim 7, wherein said slidable rail panels are provided with rollers engageable with said walkway which permit the gates to freely open.

9. The mold access and storage structure as recited in claim 7, wherein a safety switch is mounted on said railing enclosure, said switch being connected to the emergency stop circuit of the machine so that when said sliding rail panels open, the safety switch is also open thereby preventing the machine from operating.

10. The mold access and storage structure as recited in claim 1, wherein said frame is formed by a pair of longitudinally spaced apart structural members deck girders, having upper and lower flanges, with the lower flanges having a plurality of longitudinally spaced apart holes arranged in patterns to permit the legs to be attached to the structural member deck girders at different locations in order to fit the machine.

11. The mold access and storage structure as recited in claim 1, wherein said legs are attached to said frame at or near the corners thereof.

12. A mold access and storage structure for a machine comprising:

an elevated platform have a generally rectangular horizontally extending frame;

said frame having a pair of longitudinally extending parallel structural member deck girders having upper and lower horizontal flanges, with the lower horizontal flanges having a series of bolt openings arranged in a pattern;

a pair of parallel transversely extending girders extending between the ends of said longitudinally extending structural members girders;

legs attached to said longitudinally extending structural member girders and straddling the machine by holding said platform above the machine;

a walkway mounted on said frame along one of said transverse girders and one of said longitudinal structural member deck girders;

a plurality of spaced apart parallel oil and water containment reservoirs carried by said frame adjacent said walkway and along the other transverse and longitudinal structural member deck girders;

said reservoirs each having a bottom wall and four upstanding side walls for receiving and storing a mold when not in use by the machine and for collecting any oil or lubricant draining from the mold; and a vertical ladder with upper and lower ends for permitting a person to access said walkway, said ladder having a lower end engaging the ground and the upper end attached to said frame near said walkway.

13. The mold access and storage structure as recited in claim 12, wherein said frame is comprised of structural steel members which are fastened together.

14. The mold access and storage structure of claim 13, wherein said structural steel members forming said frame are connected to said legs by nuts and bolts which are removable to permit the frame and associated structure to be disassembled from said legs to permit access to the machine for repair and maintenance purposes.

15. The mold access and storage structure of claim 12, wherein said elevated platform includes a railing enclosure mounted at the top of said frame and which extends around the outer periphery of said walkway and said reservoirs.

16. The mold access and storage structure as recited in claim 15, wherein said railing enclosure includes an inwardly swingable gate forming a part thereof, said swingable gate being located above said vertical ladder, said gate, when opened inwardly, permitting a person to access the platform and the molds stored in the reservoirs.

17. The mold access and storage structure as recited in claim 16, wherein said swingable gate is mounted on said railing enclosure by a pair of spring loaded hinges which return the gate to a closed position once the opening force against the gate has been removed.

18. The mold access and storage structure as recited in claim 15, wherein said railing enclosure includes a pair of slideable rail panels, movable towards and away from each other, to close and open the space therebetween; and a flip-out ladder hingedly connected to said walkway; said flip-out ladder being provided with only a few steps; said flip-out ladder being swingable through the space between said slideable rail panels when open to permit a person to climb down the flip-out ladder to the top of the machine.

19. The mold access and storage structure defined in claim 18, wherein said slideable rail panels are provided with rollers engageable with said walkway which permit the gates to freely open.

20. The mold access and storage structure as recited in claim 18, wherein a safety latch and switch is mounted on said slideable rail panels of the railing enclosure, said switch being connected to the emergency stop circuit of the machine so that when said safety sliding rail panels open, the safety switch is also open thereby preventing the machine from operating.

21. The mold access and storage structure as recited in claim 12, wherein said frame include a pair of spaced apart, longitudinally extending structural member deck girders, having upper and lower flanges, with the lower flanges having a plurality of longitudinally spaced apart holes arranged in patterns to permit the legs to be attached to the structural member girders at different locations in order to select the proper location for the legs to fit around the machine.

* * * * *